(12) United States Patent
Ach et al.

(10) Patent No.: US 10,105,769 B2
(45) Date of Patent: Oct. 23, 2018

(54) MACHINING TOOL AND METHOD FOR MANUFACTURING A MACHINING TOOL

(71) Applicant: Kennametal Inc., Latrobe, PA (US)

(72) Inventors: Eduard Ach, Mossbach (DE); Christoph Gey, Zirndorf (DE)

(73) Assignee: KENNAMETAL INC., Latrobe, PA (US)

(*) Notice: Subject to any disclaimer, the term of this patent is extended or adjusted under 35 U.S.C. 154(b) by 206 days.

(21) Appl. No.: 14/687,189

(22) Filed: Apr. 15, 2015

(65) Prior Publication Data

US 2015/0298222 A1   Oct. 22, 2015

(30) Foreign Application Priority Data

Apr. 17, 2014  (DE) .................. 10 2014 207 507

(51) Int. Cl.
| | |
|---|---|
| B23C 5/00 | (2006.01) |
| B23B 51/02 | (2006.01) |
| B23B 51/06 | (2006.01) |
| B23C 5/10 | (2006.01) |
| B23C 5/28 | (2006.01) |
| B23P 15/32 | (2006.01) |
| B23P 15/34 | (2006.01) |
| B33Y 80/00 | (2015.01) |

(52) U.S. Cl.
CPC ............ B23C 5/006 (2013.01); B23B 51/02 (2013.01); B23B 51/06 (2013.01); B23C 5/10 (2013.01); B23C 5/28 (2013.01); *B23B 2251/50* (2013.01); *B23P 15/32* (2013.01); *B23P 15/34* (2013.01); *B33Y 80/00* (2014.12)

(58) Field of Classification Search
CPC ............ B23B 2231/24; B23B 2250/12; B23B 2251/40; B23B 51/06; B23B 51/0486; B23B 51/042
See application file for complete search history.

(56) References Cited

U.S. PATENT DOCUMENTS

| | | | |
|---|---|---|---|
| 385,088 A | 6/1888 | Benzie | |
| 864,756 A | 8/1907 | Phillips | |
| 1,476,019 A | 12/1923 | Lowry | |
| 1,781,863 A | 11/1930 | Shoemaker | |

(Continued)

FOREIGN PATENT DOCUMENTS

| | | |
|---|---|---|
| CA | 2405109 | 1/2006 |
| CN | 1041897 A | 5/1990 |

(Continued)

OTHER PUBLICATIONS

Aug._2014—Technnologietrends—Mapal.

(Continued)

*Primary Examiner* — Will Fridie, Jr.
(74) *Attorney, Agent, or Firm* — Larry R. Meenan

(57) ABSTRACT

A machining tool, in particular a drill carrier tool, includes a monolithic base body extending in the axial direction which, at least in one section, has a porous or grid-like core structure that is encased in a solid outer jacket. These measures allow less material to be used, while maintaining good mechanical properties. The porous or grid-like core structure is simultaneously used for transporting coolant. The base body is manufactured in particular by means of a 3D printing method.

17 Claims, 2 Drawing Sheets

(56) References Cited

U.S. PATENT DOCUMENTS

| | | | |
|---|---|---|---|
| 1,951,856 | A | 3/1934 | Balke |
| 1,965,950 | A | 7/1934 | Walker |
| 2,289,065 | A | 7/1942 | Edd |
| 2,289,344 | A | 7/1942 | Cedarleaf |
| 2,682,414 | A | 6/1954 | Richardson |
| 3,455,000 | A | 7/1969 | Flaherty |
| 3,646,679 | A | 3/1972 | Naugle |
| 3,654,681 | A | 4/1972 | Stein |
| 3,705,447 | A | 12/1972 | Kollar |
| 3,857,305 | A | 12/1974 | Lichtman |
| 4,373,518 | A | 2/1983 | Kaiser |
| 4,481,016 | A | 11/1984 | Campbell |
| 4,505,626 | A | 3/1985 | Benhase |
| 4,591,302 | A | 5/1986 | Lovendahl |
| 4,725,171 | A | 2/1988 | DeTorre |
| 4,728,231 | A | 3/1988 | Kunimori |
| 4,749,618 | A * | 6/1988 | Kawaguchi ............... B43K 1/12 401/196 |
| 4,826,364 | A * | 5/1989 | Grunsky ................. B23B 51/06 408/230 |
| 4,844,668 | A | 7/1989 | Pettersson |
| D305,498 | S | 1/1990 | Lassiter |
| 4,898,499 | A | 2/1990 | Tsujimura |
| 4,946,319 | A | 8/1990 | Lyon |
| 5,066,170 | A | 11/1991 | Berryer |
| 5,078,551 | A | 1/1992 | Oomen |
| 5,098,232 | A | 3/1992 | Benson |
| 5,178,645 | A | 1/1993 | Nakamura |
| 5,205,680 | A | 4/1993 | Lindstedt |
| 5,342,151 | A | 8/1994 | Friedmann |
| 5,362,183 | A | 11/1994 | Alario |
| 5,433,280 | A | 7/1995 | Smith |
| 5,634,933 | A | 6/1997 | McCombs |
| 5,685,671 | A | 11/1997 | Packer |
| 5,722,803 | A | 3/1998 | Battaglia |
| 5,799,553 | A | 9/1998 | Billatos |
| 5,820,313 | A * | 10/1998 | Weber ................. B23D 77/042 408/226 |
| 6,030,156 | A | 2/2000 | Andronica |
| 6,053,669 | A * | 4/2000 | Lagerberg ............... B23B 27/10 407/11 |
| 6,062,753 | A * | 5/2000 | Hadtke ............... B29C 45/1676 401/6 |
| 6,116,823 | A | 9/2000 | Mihic |
| 6,116,825 | A | 9/2000 | Kammermeier |
| 6,146,476 | A | 11/2000 | Boyer |
| 6,161,990 | A | 12/2000 | Oles |
| 6,315,505 | B1 | 11/2001 | Moore |
| 6,394,466 | B1 | 5/2002 | Matsumoto |
| 6,402,438 | B1 | 6/2002 | Boyer |
| 6,472,029 | B1 | 10/2002 | Skszek |
| 6,524,036 | B1 | 2/2003 | Koelker |
| 6,554,010 | B1 * | 4/2003 | Hirose ..................... B08B 1/04 134/153 |
| 6,607,533 | B2 | 8/2003 | Del Rio |
| 6,692,199 | B2 | 2/2004 | Andersson et al. |
| 6,712,564 | B1 | 3/2004 | Hughes |
| 6,715,968 | B1 | 4/2004 | Taegtstroem |
| 6,733,603 | B1 | 5/2004 | Wu |
| 6,808,340 | B2 | 10/2004 | Travez |
| 6,929,426 | B2 | 8/2005 | Thiele |
| 7,112,020 | B2 | 9/2006 | Sheffler |
| 7,226,254 | B2 * | 6/2007 | Friedrichs ............. B23B 31/005 408/226 |
| 7,313,991 | B2 | 1/2008 | Penkert |
| 7,614,831 | B2 | 11/2009 | Liu |
| 7,785,046 | B2 * | 8/2010 | Beckington ............. B23B 31/02 279/20 |
| 8,308,403 | B2 | 11/2012 | Hecht |
| 8,534,963 | B2 | 9/2013 | Luik |
| 8,746,703 | B2 | 6/2014 | Xu |
| 2001/0056309 | A1 | 12/2001 | Jain et al. |
| 2003/0094730 | A1 | 5/2003 | Dourfaye et al. |
| 2003/0118412 | A1 | 6/2003 | Fukui |
| 2003/0210963 | A1 | 11/2003 | Kakai |
| 2004/0107019 | A1 | 6/2004 | Keshavmurthy et al. |
| 2004/0120777 | A1 | 6/2004 | Noland |
| 2004/0120778 | A1 | 6/2004 | Lach |
| 2004/0221696 | A1 | 11/2004 | Matsuhashi |
| 2004/0258491 | A1 | 12/2004 | Penkert |
| 2005/0238451 | A1 | 10/2005 | Hartman |
| 2006/0039818 | A1 | 2/2006 | Tsai et al. |
| 2006/0048615 | A1 | 3/2006 | Treige |
| 2006/0144198 | A1 | 7/2006 | Okajima |
| 2007/0006694 | A1 | 1/2007 | Fujimoto |
| 2007/0212177 | A1 | 9/2007 | Liu |
| 2008/0065259 | A1 | 3/2008 | Dietrich et al. |
| 2008/0075618 | A1 | 3/2008 | Martin et al. |
| 2008/0080937 | A1 | 4/2008 | Hecht |
| 2008/0253849 | A1 | 10/2008 | Yoshinaga |
| 2008/0260479 | A1 * | 10/2008 | Kammermeier ...... B23B 31/028 408/59 |
| 2008/0260964 | A1 | 10/2008 | Bagavath-Singh et al. |
| 2009/0035075 | A1 | 2/2009 | Hecht |
| 2009/0035411 | A1 | 2/2009 | Seibert et al. |
| 2009/0114628 | A1 | 5/2009 | DiGiovanni |
| 2010/0086373 | A1 * | 4/2010 | Kleiner ................. B23D 77/006 408/1 R |
| 2010/0172703 | A1 | 7/2010 | Neubold |
| 2010/0242696 | A1 * | 9/2010 | Digernes ................. B23B 27/10 83/169 |
| 2010/0254772 | A1 | 10/2010 | Rozzi |
| 2010/0270757 | A1 * | 10/2010 | Beckington ......... B23B 31/1179 279/20 |
| 2011/0156304 | A1 | 6/2011 | Walker et al. |
| 2011/0210096 | A1 | 9/2011 | Raji |
| 2011/0266068 | A1 | 11/2011 | Eason et al. |
| 2011/0291331 | A1 | 12/2011 | Scott |
| 2012/0018924 | A1 | 1/2012 | Swanson et al. |
| 2012/0068378 | A1 | 3/2012 | Swanson et al. |
| 2012/0070523 | A1 | 3/2012 | Swanson et al. |
| 2012/0103701 | A1 | 5/2012 | Cho et al. |
| 2012/0135166 | A1 | 5/2012 | Berglund |
| 2012/0141215 | A1 | 6/2012 | Choi |
| 2012/0183802 | A1 | 7/2012 | Bruck |
| 2012/0232857 | A1 | 9/2012 | Fisker et al. |
| 2012/0326356 | A1 | 12/2012 | Martin |
| 2013/0004680 | A1 | 1/2013 | Godfrey |
| 2013/0015596 | A1 | 1/2013 | Mozeika et al. |
| 2013/0034399 | A1 * | 2/2013 | Omagari ................. B23C 5/109 409/136 |
| 2013/0040051 | A1 | 2/2013 | Mourou et al. |
| 2013/0059509 | A1 | 3/2013 | Deopura et al. |
| 2013/0088364 | A1 | 4/2013 | Bittar et al. |
| 2013/0101746 | A1 | 4/2013 | Keremes et al. |
| 2013/0105230 | A1 | 5/2013 | Brackin et al. |
| 2013/0136868 | A1 | 5/2013 | Bruck et al. |
| 2013/0161439 | A1 | 6/2013 | Beery et al. |
| 2013/0161442 | A1 | 6/2013 | Mannella et al. |
| 2013/0164960 | A1 | 6/2013 | Swanson et al. |
| 2013/0170171 | A1 | 7/2013 | Wicker et al. |
| 2013/0209600 | A1 | 8/2013 | Tow |
| 2013/0220570 | A1 | 8/2013 | Sears et al. |
| 2013/0220572 | A1 | 8/2013 | Rocco et al. |
| 2013/0221191 | A1 | 8/2013 | Sears et al. |
| 2013/0223943 | A1 | 8/2013 | Gey et al. |
| 2013/0224423 | A1 | 8/2013 | Mikulak et al. |
| 2013/0247475 | A1 | 9/2013 | Lind et al. |
| 2013/0248260 | A1 | 9/2013 | Ganz |
| 2013/0255346 | A1 | 10/2013 | Danby et al. |
| 2013/0277121 | A1 | 10/2013 | Stevens et al. |
| 2015/0042050 | A1 * | 2/2015 | Haimer ............... B23B 31/1179 279/102 |
| 2015/0298221 | A1 * | 10/2015 | Ach ........................ B23C 5/28 407/11 |
| 2015/0367423 | A1 * | 12/2015 | Voss ................... B23B 31/1179 279/20 |
| 2016/0031015 | A1 * | 2/2016 | Doi ..................... B23B 31/305 279/4.03 |

(56) References Cited

U.S. PATENT DOCUMENTS

FOREIGN PATENT DOCUMENTS

| | | |
|---|---|---|
| CN | 1689739 | 11/2005 |
| CN | 1910003 A | 2/2007 |
| CN | 101068644 A | 11/2007 |
| CN | 201579425 U | 9/2010 |
| CN | 102056696 A | 5/2011 |
| CN | 102427858 A | 4/2012 |
| DE | 19730539 C1 | 4/1999 |
| DE | 19860585 A1 | 7/2000 |
| DE | 10336923 | 3/2005 |
| DE | 102004042775 | 3/2006 |
| DE | 19901777 B4 | 8/2007 |
| DE | 102006005401 A1 | 8/2007 |
| DE | 202010015446 U1 | 2/2011 |
| EP | 191203 | 8/1986 |
| EP | 128912 | 8/1996 |
| EP | 843609 | 9/1999 |
| EP | 1537930 | 6/2005 |
| EP | 1534451 | 2/2007 |
| EP | 2367669 | 9/2011 |
| EP | 2646185 | 10/2013 |
| EP | 2646224 | 10/2013 |
| EP | 2646641 | 10/2013 |
| EP | 2654412 | 10/2013 |
| GB | 2500996 | 10/2013 |
| JP | S61109606 | 5/1986 |
| JP | H04226826 A | 8/1992 |
| JP | H0623615 | 2/1994 |
| JP | H08206133 | 8/1996 |
| JP | H1150254 | 2/1999 |
| JP | 2004216483 | 8/2004 |
| JP | 2008062369 | 3/2008 |
| JP | 2009006436 | 1/2009 |
| WO | 2005025779 | 10/2005 |
| WO | WO2007104065 A1 | 9/2007 |
| WO | WO2007127899 A2 | 11/2007 |
| WO | 2011135512 | 11/2011 |
| WO | 2012073099 | 6/2012 |
| WO | 2012146694 | 11/2012 |
| WO | 2012071449 | 1/2013 |
| WO | 2013030064 | 3/2013 |
| WO | 2013087515 | 6/2013 |
| WO | 2013124691 | 8/2013 |
| WO | 2013126981 | 9/2013 |
| WO | 2013140146 | 9/2013 |
| WO | 2013112217 | 10/2013 |
| WO | 2013149659 | 10/2013 |
| WO | 2013154723 | 10/2013 |

OTHER PUBLICATIONS

Feb 12, 2016 Office action (3 months) 1 K-04311-US-NP.
May 17, 2017 First office action.
Apr. 16, 2015 Search Report.
Aug. 19, 2014 Office Action.
Jul. 21, 2015 Final Office Action.
Oct. 27, 2015 Office action (3 months).
Nov. 12, 2015 Final Office Action.
Oct. 24, 2017 First office action.
Beij, K. Hilding, "Pressure Losses for Fluid Flow in 90 Degree Pipe Bends", Journal of Research of the National Bureau of Standards, 1938, vol. 21.
Nov. 13, 2017 Second Office Action.
Jan. 9, 2018 Office action (3 months).
Dec. 27, 2017 First Office Action.
Jan. 12, 2018 Second Office Action.
Feb. 13, 2018 First Office Action.
Jul. 26, 2011 International Search Report.
Fundamental Aspects in Maching of Metals with Short and Ultra-short Laser Pulses.
Lasers: Solve Every Task Perfectly, State-of-the-Art Laser Technology.
Oct. 18, 2016 Second Office Action.
Mar. 22, 2017 Office action (3 months).
Apr. 19, 2017 First office action.
Jul. 7, 2017 Office action (3 months).
Aug. 21, 2017 Final Office Action.
Nov. 3, 2016 Final Office Action.

* cited by examiner

MACHINING TOOL AND METHOD FOR MANUFACTURING A MACHINING TOOL

CLAIM TO PRIORITY

This application is a National entry application of German Application No. 102014207507.6, filed on Apr. 17, 2014, the entire contents of which is incorporated herein by reference.

FIELD OF THE INVENTION

The invention relates to a machining tool, in particular a rotating tool such as a drill or milling tool, having a monolithic base body extending in an axial direction. The invention additionally relates to a method for manufacturing a machining tool of this type.

BACKGROUND OF THE INVENTION

Machining tools, in particular drills, usually have a clamping shaft extending in the axial direction to which a slotted cutting part connects which extends up to a front tool tip, in particular to a drill bit. In the case of such machining tools, which are also referred to as shaft tools, coolant channels are often formed in the interior of the base body, as can be seen in EP 0 843 609 B1, for example.

In what are referred to as solid carbide drills, a monolithic base body is formed as a sintered body. The manufacturing process involves first making a base body by compression from a metal powder as sinter material, for example, which is then sintered. U.S. Pat. No. 7,226,254 B2 discloses a sintered base body in which, to save sinter material, a central recess is made in the base body in the area of the clamping shaft prior to sintering said base body. The sinter material thus saved is used for manufacturing additional tools.

SUMMARY OF THE INVENTION

Based on this, the invention forms a basis for providing a machining tool as well as a method for the manufacturing thereof, in which an efficient use of material and good mechanical properties are both ensured.

The problem is solved according to the invention by a machining tool having the features of claim 1. The machining tool is a rotating tool in particular, such as a drill or milling tool, for example. It comprises a monolithic base body extending in the axial direction in which a non-solid core structure is formed, at least in a section extending in the axial direction, which is encased by a solid outer jacket. The outer jacket annularly encases the non-solid core structure preferably at a constant wall thickness. A large part of the base body is deliberately designed to be not solid due to the core structure which is non-solid compared to the solid outer jacket, thereby saving not only weight, but also material. At the same time, sufficiently high mechanical stability is achieved by the special core structure with the solid outer jacket structure. In this way, the core structure provides a type of mechanical support structure.

In this respect, it is especially important that the base body is a monolithic body. This term is understood to mean that the base body, i.e., in particular also the combination of the core structure with the outer jacket, is constructed from a single body, i.e., is made from one piece and is not assembled from two or more parts, e.g., by welding, soldering, bonding or similar.

The term non-solid core structure is generally understood to mean that open areas are formed in the core structure in which no material is present.

The core structure is preferably optionally porous, grid-like or even bionic. The term porous is generally understood to mean a structure in which individual pores are preferably scattered, i.e. unstructured and omnidirectional in the material of the core structure. Both open-pore as well as closed-pore structures are possible. In the case of an open-pore structure, on the whole, the core structure is permeable to a gas or liquid, such as a coolant, for example.

The term grid-like is understood to mean a structure in which areas that are free of material are separated from one another by partitions, in particular channels, usually in an ordered material structure, for example a periodic material structure. These individual channels preferably extend in the axial direction.

A bionic structure, in contrast, is understood to be an unordered, in particular non-periodic arrangement of partitions of this type, based, in particular, on patterns from nature.

According to the invention, the machining tool is manufactured with the aid of a method having the features of claim 12, which provides that the base body is manufactured with the aid of a 3D printing method. In the meantime, 3D printing methods have been used for a wide variety of applications. These methods basically involve processing a powdery starting material layer-by-layer with a laser, such that the individual powder particles bond to one another, for example, melt with or sinter with one another layer-by-layer into a solid, rigid body. The layer-by-layer, stratified construction makes it possible to easily form undercuts and complex geometrical structures, which, with previous conventional manufacturing methods, was not possible or required considerable effort and expense. In this case, a metal powder having an average grain size ranging between 10 and 50 µm is used as a starting material in powder form. In particular, the material for the metal powder is a tool steel.

Accordingly, this specific method, which makes it possible to create very fine structures, is provided for forming the specific non-solid core structure in the present invention.

The machining tool is optionally an monolithic tool taken as a whole having a tool tip integrated into the base body or, alternatively, it is what is known as a carrier tool consisting of a support made up of the base body and a preferably reversibly replaceable cutting element applied thereon.

The machining tool generally has at its front end a tool tip which is itself designed as a cutting element or one or more cutting elements are arranged in the area thereof. In the present invention, a tool tip is thus generally understood to mean the frontal end area of the machining tool, i.e. a forward face area of the machining tool. If the tool is designed as a modular carrier tool, a replaceable cutting element (cutting insert) is attached to the base body. According to a preferred variant, the tool tip itself is designed as a replaceable cutting insert. This can be reversibly and replaceably attached to the base body by clamping, for example, with the aid of fastening elements such as screws, or alternatively by simple turning. In this way, it is held clamped in particular between two retaining or clamping strips of the base body. Alternatively, the carrier tool is designed with plate seats for attaching (indexable) cutting inserts. In this case, the area of the plate seats is understood to mean the tool tip. In a non-modular, one-piece tool having, for example, major cutting edges cut into the end face area, a front end face area having an axial length in the range of a nominal diameter, for example, constitutes the tool tip.

Drills and milling tools in general are classified as rotating tools. It is thus understood that, during operation, the machining tool rotates around a center axis which at the same time defines the rotational axis.

A further advantage of the core structure centrally formed in the base body is that it is of lower density than the solid annular outer jacket. This results in a density distribution with greater density in the outer area, which results in a more stable rotation, particularly in rotating tools. The core structure is preferably designed to be rotationally symmetrical and preferably circular, at least rotationally symmetrical with at least a two-fold to six-fold rotational geometry.

To give it an especially high mechanical rigidity, the core structure is expediently designed as a honeycomb structure. This constitutes a special type of grid-like core structure in which the individual channels have a hexagonal cross-section.

In the case of a grid-like core structure, for example a honeycomb structure, a plurality of longitudinally extending channels are formed. In the present invention, the term plurality is understood to mean in particular that at least five, preferably at least eight or even significantly more channels are incorporated. The individual channels expediently have a maximum channel width below 0.5 mm and in particular below 0.10 mm.

If the core structure is porous, it expediently has a porosity ranging between 5 and 90%. This means that, compared to a solid body, between 5 and 90% of the volume consists of pores. The pores preferably have an average pore size ranging between 15 and 45 µm.

The core structure expediently has, at least in a shaft part, a circular cross-section and is designed to be concentric in particular to the annular outer jacket. The core structure as well as the outer jacket are thus coaxial to the center axis and in particular to the rotational axis.

Overall, the core structure covers an area of preferably around 5 to 80% of a total cross-sectional area of the base body. If the core structure is circular, it has a core radius that is preferably between 50 and 90% of an outer radius of the base body. Formed thereon is a comparatively narrower circumferential solid rim forming the outer jacket, preferably of constant wall thickness, which, however, is sufficiently dimensioned for the required mechanical loads, for example the clamping forces present when clamping the base body. The core structure portion expediently varies in the axial direction. In particular, the portion of the core structure differs between a front fluted cutting part and a rear shaft part. In the front cutting part, the portion of the core structure is in the lower range, for example between 5 and 30%, while in the shaft part it is in the upper range, for example between 40 and 80%, relative to the total cross-sectional area (recesses, such as chip flutes for example, do not count toward total cross-sectional surface).

In a useful embodiment, the core structure comprises a cross-sectional area that changes in the axial direction. In principle, the special manufacturing method of 3D printing allows any desired structure to be created. In the present invention, this method is utilized to the extent that a core structure geometry specifically adapted to the base body geometry is created in different axial sections of the base body. Varying the cross-sectional geometry additionally allows mechanical properties to be suitably adjusted at defined axial positions. In particular, allowance is made for highly loaded sections, for example, by enlarging the wall thickness of the solid outer jacket in these sections.

In an especially expedient refinement, solid struts are introduced into the core structure in the direction of the center axis to thereby achieve additional improvement in rigidity. Struts of this type are expediently bent in the shape of a sickle, for example, to transmit increased mechanical loads arising at the cutting edges into the interior of the base body, for example. The number of struts introduced is expediently equal to the number of cutting edges distributed circumferentially. If two circumferential cutting edges are present, the two struts preferably merge into one another in the center axis and are, for example, wound on the whole into the shape of an S. The struts form, for example, a structure in the shape of spokes and spoked wheel. The struts basically have a wall thickness significantly greater than the normal wall thickness of the grid-like core structure. For example, they are many times greater than the normal wall thickness. The wall thickness of the struts also preferably varies depending on their radial position, and specifically preferably varies continuously.

The base body usually comprises a shaft part as a clamping shaft with which it is clamped into a clamping device of a machine tool. The center axis of the machining tool is oriented so that it is precisely coaxial with the rotational axis of the machine tool. Connecting to the front of the shaft part in the axial direction is a front cutting part, which is usually provided with chip flutes. These are designed to either run in a straight line or to run helically. In an expedient design, the core structure further extends into the cutting part starting from the shaft part, so that a continuous core structure is formed. In this case, the core structure preferably has a circular cross-sectional geometry in the shaft part, which transitions into an altered geometry in the cutting part.

The core structure is expediently designed to be elongated in the area of the fluted cutting part and crossing into a center area of the base body. It additionally comprises widened areas on both sides of the center area, giving its cross-section an overall bone-like appearance. Its opposite end areas are spherical or rounded, so that, in particular, the radially outer course of the core structure runs concentrically to the outer jacket.

In an especially expedient embodiment, the core structure is designed to be suitable for conducting coolant and extends from a rearward end to a front end face of the base body. For this purpose, in particular, a conventional, standardized coolant connection is expediently formed at the rearward end of the base body. This typically comprises a transverse groove into which a coolant is fed from the machine tool.

At the front end face, coolant optionally exits the base body or is transferred to an interface with a tool tip into which the coolant can then be further fed.

Taken as a whole, the machining tool is designed in an expedient embodiment as a carrier tool having at least one cutting element that can be secured to the base body, in particular a tool tip or cutting plates. The base body is preferably manufactured from a tool steel. The cutting element, in contrast, is made of a harder material such as a solid carbide or also a ceramic, for example. It is secured to the base body in particular as a reversibly detachable insert.

BRIEF DESCRIPTION OF THE DRAWINGS

Exemplary embodiments of the invention are explained below in greater detail based on the figures, some of which are simplified illustrations.

Parts having the same effect are given the same reference numbers in the figures.

DETAILED DESCRIPTION OF THE INVENTION

Figure 1:
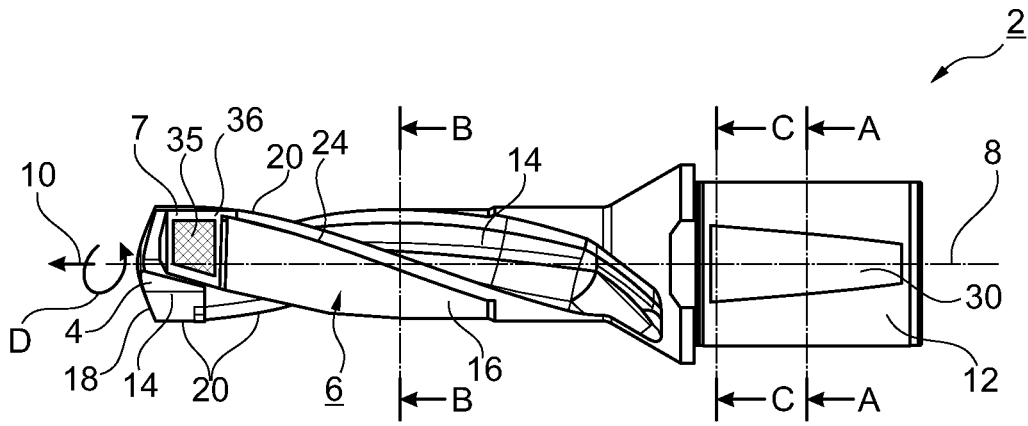
FIG. 1 shows a side view of a machining tool designed as a modular carrier tool.
Figure 2:
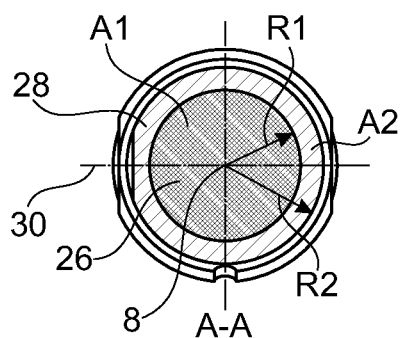
FIG. 2 shows a sectional view through the machining tool as shown in FIG. 1 along intersecting line A-A.
Figure 3:
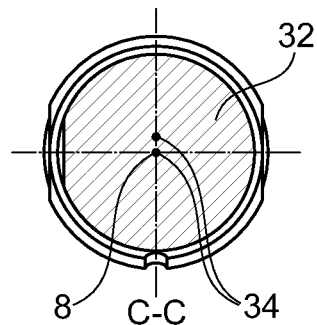
FIG. 3 shows a sectional view through the machining tool as shown in FIG. 1 along intersecting line C-C.

The machining tool 2 illustrated in FIG. 1 is designed as a modular drill tool. It has a tool tip 4 in the form of a cutting element made of solid carbide or ceramic, which is reversibly and removably attached to the frontal end of a base body 6. In the present invention, a tool tip is generally understood to mean the frontal end area of the machining tool 2, i.e. a front end face area of the machining tool. In the exemplary embodiment according to FIG. 1, this is formed by the replaceable tool tip 4. In the case of a carrier tool having plate seats for attaching (indexable) inserts as a cutting element, the area of the plate seat is understood to mean the tool tip. In a non-modular, one-piece tool, a front end area having an axial length, for example, in the range of a nominal diameter of the machining tool 2 is referred to as the tool tip. In the exemplary embodiment according to FIG. 1, the tool tip 4 is clamped as a reversibly replaceable insert between two clamping or retaining webs 7 of the base body 6.

The machining tool 2, and thus also the base body 6, as well as the tool tip 4 each extend in an axial direction 10 along a center axis 8 from a rearward end to a front end. At the same time, this center axis 8 defines a rotational axis around which the machining tool rotates in a rotational direction D during operation.

The base body 6 is in turn divided into a rear shaft part 12, with which the machining tool 2 is held clamped in a tensioning piece of a machine tool during operation. A cutting part 16 provided with chip flutes 14 is connected to the shaft part 12 in the axial direction 10. In the exemplary embodiment, the chip flutes 14 extend in a helical pattern. The end-face tool tip 4 has major cutting edges 18, each of which typically transitions into a minor cutting edge 20 on the circumferential side. These are continued in the cutting part 16.

A support bevel 24 adjoins the minor cutting edge 20 opposite to the direction of rotation.

As is described below based on FIGS. 2 through 5, the base body 6 is a monolithic base body 6, which is formed not from a solid material, but rather—at least in axial sections has a non-solid core structure 26. As FIG. 2 in particular illustrates, this core structure is designed as a circular structure in the shaft part 12, as seen in the cross-sectional view. To do this, the core structure 26 in this shaft part 12 is preferably designed to have a constant radius $R_1$. A support bevel 24 adjoins the minor cutting edge 20 opposite the direction of rotation. This cylindrical core structure 26 is surrounded by an outer jacket 28, which, except for a flattening 30 introduced externally, is designed as an annular ring. This outer mantel 28 has a radius $R_2$. The radius $R_1$ of the core structure 26 is preferably approximately 50 to 90% of the outer radius $R_2$. The core structure 26 has a core cross-sectional area A1, and the machining tool 2 has a total cross-sectional area A2. This area is defined by the area enclosed by the outer jacket 28, including the surface of the outer jacket 28.

At the rearward end of the shaft part 12, the same is optionally closed off with an end face plate formed of a solid material, i.e. the non-solid core structure 26 is formed only in the interior of the shaft part 12 without being visible from the rearward end face. A coolant transfer point is expediently formed and incorporated into this solid end face plate. In particular, a transverse groove having through-holes running to the core structure 26 is introduced.

In the exemplary embodiment, the core structure 26 is limited, in a similar manner, also in the axial direction 10 in the end area of the shaft part 12 by a solid partition 32 through which at least one, or in the exemplary example, two, cut-outs 34, penetrate. Alternatively, the core structure 26 also spans uninterrupted from the shaft part 12 into the cutting part 6 and without partition 32. A partition 32 is provided particularly in machining tools 2 without internal coolant supply. However, coolant supply is made possible in principle via the cut-outs 34 in the cutting part 16.

In the front area of the machining tool 2, i.e. in the area of the tool tip 4, at least one outlet point 35 for coolant or lubricant is provided. Multiple outlet points 35, which are oriented for example toward cutting areas, are preferably formed in a front end face or are also formed circumferentially. The outlet point 35 can be designed as a borehole in a conventional manner. However, it is likewise preferably created by means of the 3D printing method and is geometrically complex. The core structure 26 is preferably directed to the outside to form the outlet point 35. In the exemplary embodiment illustrated in FIG. 1, an outlet point 35 is formed for example in a circumferential wall 36 in the area of the tool tip and is formed in particular as a porous structure. The outlet point 35 in the exemplary embodiment is thus generally integrated into the retaining webs 7.

Figure 4:
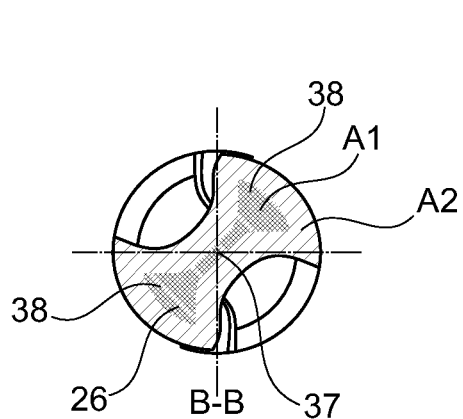
FIG. 4 shows a sectional view through the machining tool along intersecting line B-B.

The core structure 26 continues into the cutting part 16 itself (FIG. 4). Due to the chip flutes 14 and to the circumferential geometry of the base body 6 modified thereby, the cross-sectional geometry of the core structure 26 is adapted in particular such that it is enveloped entirely by roughly the same wall thickness as that of the outer jacket 28. In particular, the core structure 26 is designed to be elongated in the cutting part 16 and has a center area 37, which transitions into widened areas 38 at both ends. The outer edge of each said widened area has an accurate contour, so that they run concentrically to the circumferential line of the base body 6.

The core structure 26 is preferably homogeneous even over its entire cross sectional area A1. Alternatively, additional supports can be provided in a manner not further illustrated here. Separate coolant channels are expediently not formed in the embodiment variants of FIG. 1.

Figure 5:
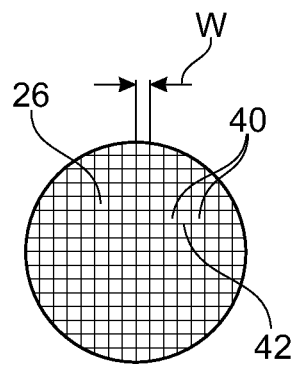
FIG. 5 shows a sectional view of a grid-like core structure.

According to a first embodiment variant, the core structure 26 is designed as a porous structure. According to a second embodiment variant illustrated in FIG. 5, in contrast, the core structure 26 is designed as a grid-like structure, in particular as a honeycomb-shaped structure. This structure has a plurality of individual channels 40 extending in the axial direction 10. Rectangular channels are schematically illustrated in FIG. 5. The individual channels 40 are each separated from one another by partitions 42. These partitions 42 preferably have only a slight material thickness of, for example, below 0.3 mm and, particularly, below 0.15 mm. The individual channels 40 usually have a channel width W of below 0.5 mm.

Figure 6:
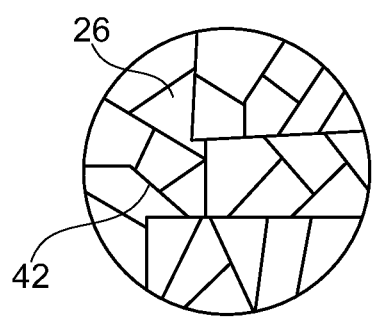
FIG. 6 shows a sectional view of a bionic core structure in the area of the intersecting line A-A as shown in FIG. 1.
Figure 7:
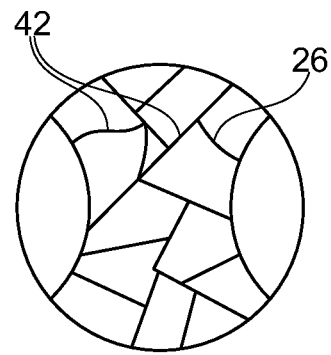
FIG. 7 shows a sectional view of a bionic core structure in the area of the intersecting line B-B as shown in FIG. 1.

Further alternatives for the core structure 26 are illustrated in FIG. 6 and FIG. 7. In these embodiment variants, the core structure 26 is designed to be what is referred to as a bionic structure, in which—in contrast to the grid-like structure illustrated in FIG. 5—the individual partitions 42 are unordered and do not follow a pattern, at least not a recurring pattern.

It is possible in principle for the different structures to be combined with one another and, for example, to be formed next to one another within a sectional plane. Alternatively, the structure varies in the axial direction 10. The specific manufacturing method allows nearly all desired combinations and variations. In particular, different structures, particularly of different porosity, are present in the cutting part 16 and the shaft part 12. Thus, for example, the cutting part 16 is of greater porosity than the shaft part 12, or vice versa.

The base body 6 is manufactured using what is referred to as a 3D printing method. In this method, a metal powder is worked successively and thus layer-by-layer by means of laser treatment according to the desired cross-sectional geometry of each layer and melted or sintered to form a cohesive, monolithic sub-body. In this process, each cross-sectional contour of each layer is predefined by the laser. With this 3D printing method, nearly any arbitrary and complex and, in particular, variable cross-sectional geometries can be created. In particular, the core structure 26 described by FIGS. 2 through 5 and having the solid enveloping outer mantel 28 is formed using this method. The entire base body 6 is thus formed as a one-piece, monolithic body by utilizing this manufacturing method. This body can also undergo finishing work, if necessary, following the 3D printing process.

The base body 6 is preferably made of tool steel according to DIN EN 10027, for example with a material number 1.2709 and/or 1.2344.

What is claimed is:

1. A rotary machining tool comprising a monolithic base body extending in an axial direction and comprising a rear shaft part and a fluted cutting part, wherein the base body has a non-solid core structure extending between flutes of the fluted cutting part, the non-solid core structure being encased in a solid outer jacket, the solid outer jacket forming a single body with the non-solid core structure and wherein the non-solid core structure extends into the rear shaft part from the fluted cutting part and has different cross-sectional areas in the rear shaft part relative to the fluted cutting part.

2. The rotary machining tool as claimed in claim 1, wherein the core structure is porous, grid-like, bionic or a combination thereof.

3. The rotary machining tool as claimed in claim 1, wherein the core structure is a honeycomb-like structure.

4. The rotary machining tool as claimed in claim 1, wherein, if the core structure is porous, the core structure has a porosity ranging between 5.2% and 90% and, wherein, if the core structure is grid-like, the core structure has a plurality of canals extending in a longitudinal direction and having a canal width (W) less than 0.5 mm.

5. The rotary machining tool as claimed in claim 1, wherein the core structure of the fluted cutting part has a cross-section which transitions from a narrow center area into a widened area at each end.

6. The rotary machining tool as claimed in claim 1, wherein the core structure covers 5% to 80% of an entire cross-sectional area (A2) of the cutting part of the base body.

7. The rotary machining tool as claimed in claim 1, wherein the core structure is designed to conduct coolant.

8. The rotary machining tool as claimed claim 1, wherein the rotary machining tool is designed as a carrier tool having a cutting element that is adapted to be secured onto the monolithic base body, and wherein the monolithic base body is manufactured from tool steel.

9. The rotary machining tool of claim 5, wherein the core structure of the rear shaft part has a radius, R1, extending from a center axis of the machining tool and the solid outer jacket has a radius, R2, extending from the center axis wherein R1 is 50 to 90 percent of R2.

10. The rotary machining tool of claim 1, further comprising a cutting tip coupled to the monolithic base body.

11. The rotary machining tool of claim 5, wherein the widened areas have arcuate contours running concentrically to a circumferential line of the base body.

12. The rotary machining tool of claim 1, wherein the solid outer jacket has one or more flat portions along circumference of the rear shaft part.

13. The rotary machining tool of claim 1, wherein an end face plate divides the rear shaft portion and cutting portion.

14. The rotary machining tool of claim 1, wherein the core structure is porous having an average pore size of 15 μm to 45 μm.

15. A rotary cutting tool comprising a monolithic base body extending in an axial direction and comprising a rear shaft part and a fluted cutting part, wherein the base body-has a non-solid core structure extending between flutes of the fluted cutting part, the non-solid core structure being encased in a solid outer jacket, the solid outer jacket forming a single body with the non-solid core structure and wherein the core structure comprises solid struts extending between cutting edges of the fluted cutting part.

16. The rotary cutting tool of claim 15, wherein the struts are sickle shaped.

17. The rotary cutting tool of claim 15, wherein the struts merge at a common point along a central longitudinal axis of the rotary cutting tool.

* * * * *